Aug. 4, 1953 — C. G. WALL — 2,647,529

MIXING VALVE

Filed Nov. 3, 1948

Inventor:
Charles G. Wall
by his Attorneys
Howson & Howson

Patented Aug. 4, 1953

2,647,529

UNITED STATES PATENT OFFICE 2,647,529

MIXING VALVE

Charles G. Wall, Philadelphia, Pa.

Application November 3, 1948, Serial No. 58,113

7 Claims. (Cl. 137—98)

1

This invention relates to a mixing valve of the type especially adapted for shower baths and similar plumbing requirements.

It is an important feature of a mixing valve of the present type that under no conditions can the hot water be turned on before the cold water, nor can the cold water be turned off before the hot water. Also, it is highly desirable that such a valve be provided with automatic balancing means which insure temperature equalization of the mixed water in the event that the relative pressure of hot and cold water be varied after the bather has set the shower control handle. Valves of this type customarily employ a single handle which controls both hot and cold water so that mixing of the high and low temperature fluids takes place in the valve unit.

A primary object of the present invention is to provide a fluid mixing valve having one manual control handle, and an automatic balancer together with means for insuring that, regardless of the position of the balancer in its housing, cold water will always be the first to flow into the mixing chamber when the valve handle is turned way from the "off" position, and will be the last to flow when the handle is turned in the opposite direction.

A further object of the invention is to provide a balancing valve assembly for water mixing valves, in which the normal cold water port in the balancing valve chamber or shuttle is by-passed at all times except when the hot water valve is open.

A further object of the invention is to provide an improved balancing valve assembly for fluid mixing valves.

Further objects will be apparent from the specification and drawings in which.

Figure 1:
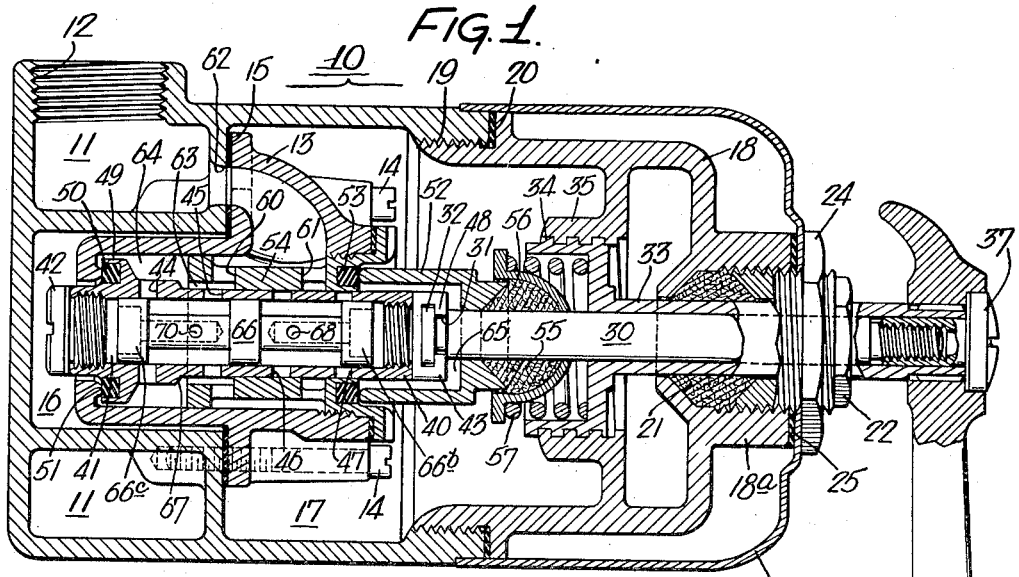
Fig. 1 is a longitudinal sectional view of a mixing valve constructed in accordance with the invention.

The invention comprises essentially the provision of a pair of sequentially operated valves, one for cold water and the other for hot water. When the valves are both open, the flow of hot and cold water is through a balancing valve assembly by means of which a sudden change in pressure or volume of either hot or cold water automatically operates to displace the balancing

2 valve axially to shut off the flow of either the hot or cold water, as the case may be. The cold water port in the shuttle which is adapted to be closed automatically by means of the balancing valve, is provided with a by-pass around the outside of the shuttle so that cold water will flow into the mixing chamber when the cold water valve is opened, regardless of the position of the balancing valve with respect to the cold water port in the shuttle. Continued axial movement of the shuttle however, eventually closes the cold water by-pass whereupon the hot water valve is opened so that the balancing valve may perform its normal balancing function without interference or diminishing of cold water flow through the by-pass.

Referring now more particularly to the drawings, the mixing valve assembly comprises a valve body 10 which includes a mixing chamber 11 and a suitable mixed water outlet 12. The valve body 10 is adapted to support a center valve casting 13 which is securely fastened to the center body by means of screws 14, 14 and gasket 15. The valve body 10 has both a cold water inlet and a hot water inlet (not shown). The former communicates with the cold water chamber or passage 16, and the latter communicates with the hot water chamber of passage 17. Valve body 10 is also provided with a cap 18 which may be tightly connected to body 10 by means of threads 19 and gasket 20. Cap 18 has at one end an annular boss 18a which contains the conventional gland assembly comprising packing 21 and gland 22. A suitable cover 23 is mounted over cap 18 and retained thereon by means of nut 24 which not only presses cover 23 against gasket 25 but also serves as a lock nut for gland 22.

The stem assembly comprises the auxiliary stem 30 which is under cut at 31 and also is provided with a shoulder 32 of larger diameter than the shank of stem 30. The auxiliary stem 30 is mounted in the hollow shank of main stem 33 which is provided with the conventional square threads 34, engaging similar threads in an annular sleeve 35 formed integrally with cap 18. The outer extremity of stem 33 is splined to receive handle 36 which is retained thereon by means of screw 37 threaded onto auxiliary stem 30.

The valve assembly comprises a shuttle 40 which is of generally tubular shape having a bore 41 closed by plugs 42 and 43, and axial sets of ports 44, 45, 46 and 47, the purpose of which will be more fully described hereinafter. Plug 43 is provided with a pair of ears 48 which form a radial slot adapted to receive flange 32 on auxiliary stem 30 in such a manner that the shuttle 40 is responsive to axial movement of stem 30 but does not necessarily rotate with the stem. The opposite end of shuttle 40 carries the primary cold water valve 49 including a conventional washer 50 adapted to seat against the cold water valve seat 51 formed integrally on center valve casting 13.

The primary hot water valve 52 is slidably mounted on auxiliary stem 30 and adapted to be compressed against the hot water washer 53 in shuttle guide 54. Valve 52 is sealed with respect to auxiliary valve 30 by means of packing 55 and socket 56. Spring 57 acts to maintain packing 55 in sealing relation with valve 52 and auxiliary stem 30, and at the same time urges valve 52 into sealing contact with hot water washer 53 except when valve 52 is raised from the washer by means of the position of stems 30 and 33.

Shuttle guide 54 is provided with a plurality of radially disposed cold water ports 60 and hot water ports 61, both of which communicate with mixing chamber 11 through passage 62. The bore of shuttle guide 54 is of proper diameter to provide axial movement of shuttle 40 to permit ports 45, 46 and 47 to register with ports 60 and 61 in accordance with the position of handle 36. However, it will be noted that the bore of shuttle guide 54 is enlarged at 63 to provide an annular passage or port between cold water chamber 64 and ports 60.

Figure 2:
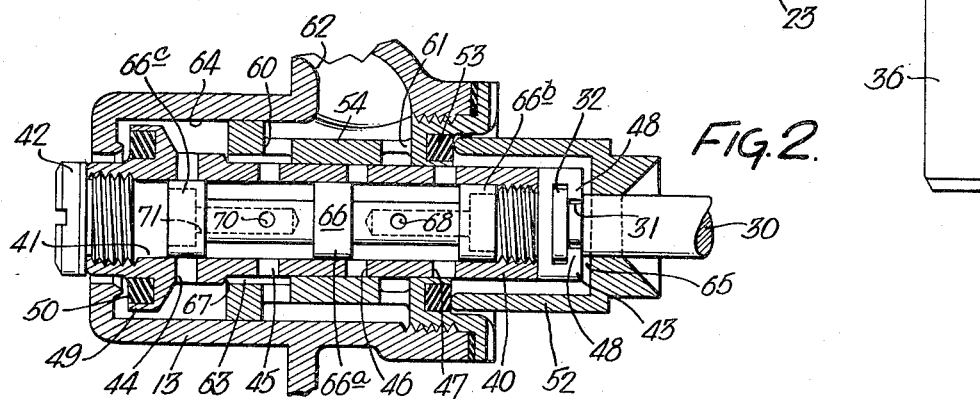
Fig. 2 is an enlarged detail of the balancing valve assembly and its associated structure, showing the balancing valve in position to close the cold water port in the shuttle.
Figure 3:
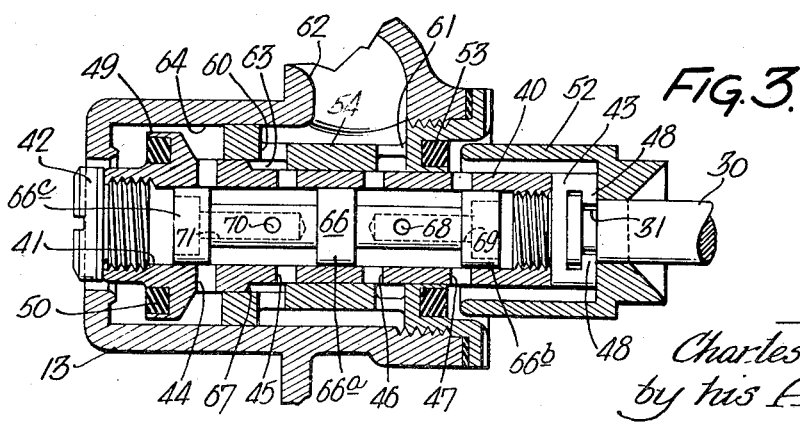
Fig. 3 is a view similar to Fig. 2 but with the balancing valve in normal balancing position.

In operation, the shuttle 40 moves from a closed position as shown in Fig. 1, in which both the cold water valve 47 and the hot water valve 52 are closed, to a fully open position as shown in Fig. 3. As the handle 36 is turned to move stem 33 on threads 34, cold water valve 49 immediately unseats to permit flow of cold water from chamber 16 into chamber 64. Since a predetermined clearance 65 is provided between the end of plug 48 and the base of valve 52, the hot water valve 52 remains seated due to the tension of spring 57. Cold water flowing into chamber 64 will normally pass through port 44 into the bore 41 of shuttle 40, thence outwardly through port 45 and 60 into mixing chamber 11 through conduit 62. However, in the event that balancer 66 closes port 44, cold water may still pass from chamber 64 into conduit 62 through the annular by-pass passage 63 and port 60. Further movement of handle 36 continues to open cold water valve 49 until plug 22 contacts valve 52, at which time the hot water valve 52 is unseated from washer 53 to permit flow of hot water. At the same time or slightly before valve 52 opens, by-pass passage 63 is closed by means of shoulder 67 on shuttle 40. Since there is an appreciable bag between the opening of valve 52 and the registering of ports 46 and 61, sufficient time will be permitted for the hot water to move balancer 66 to the left in Fig. 2, thus opening the cold water port 44 so that with both hot and cold water valves open the balancer 66 permits flow of cold water as well as hot water and hence performs its normal function of floating in bore 41 in accordance with the relative hot and cold water pressures. The ports in shuttle 40 controlled by balancer 66 as well as passage 63 around the shuttle guide, function as secondary valves through which fluid must flow in passing from either chamber 16 or 17 to chamber 11.

Hot water passing under valve 52 enters shuttle 40 through port 47 and exerts pressure on the piston 66a of balancer 66 to the left, as shown in Fig. 3. Suitable relief for the balancer 66 is obtained by means of port 68 which communicates with the bore 41 of the shuttle through hollow passage 69 in the shank of balancer 66 and right-hand balancer guide 66b. Cold water entering the shuttle through passage 44 likewise exerts pressure on the opposite side of piston 66a and cold water relief with the bore 41 is provided through port 70 and passage 71 in balancer guide 66c. Thus it will be understood that failure or decrease of hot water pressure moves the balancer 66 to the right so that guide 66c closes port 44, preventing chilling; whereas failure of cold water pressure moves balancer 66 to the left to cause guide 66b to close port 47, thus preventing scalding.

It will thus be apparent that regardless of the position of balancer 66 in shuttle 40, cold water will always flow to mixing chamber 11 immediately on opening of the cold water valve 49. This initial cold water flow may take place either through port 44 in the event that balancer guide 66c does not close this port, or it may take place through the by-pass passage 63 and port 60 in the event that port 44 is completely closed, as shown in Fig. 2. Conversely, when the valve is being closed or in other words, when it is being turned towards the "off" position from the full "open" position, cold water will be permitted to flow into chamber 11 as soon as shoulder 67 clears the bore of shuttle guide 54, thus enabling cold water to flow regardless of the position of balancer 66 and regardless of the position of hot water valve 52.

The clearance at 65 is closely controlled with respect to the position of shoulder 67 so that hot water valve 52 will open before the by-pass 63 is completely closed. This enables the balancer to take over control of the fluid flow and thus prevent scalding or chilling even though the by-pass is closed.

I have therefore provided a mixing valve of the class described which has the distinct advantages of avoiding any internal or external positioning means for the balancer 66; for example, it is not necessary to spring-load the balancer to prevent undesired closing of the cold water port. Obviously, such spring-loading impairs the balancing effect during normal operation. Furthermore, my construction enables the use of sequential rather than simultaneous opening of the hot and cold water valves, which is an important feature in preventing scalding. Certain constructions of the prior art have utilized simultaneous opening valves in order to permit immediate functioning of the balancer. The distadvantage of such construction resides in the fact that the time lag to achieve normal balancer functioning may be so great that scalding is not always avoided. Furthermore, the inability to obtain close mixing regulation is largely destroyed in such a valve. An additional feature of my construction is that is enables the valves to be placed ahead of the balancer so that the most advantageous balancing action is obtained.

Having thus described my invention, I claim:

1. A fluid mixing valve assembly having a housing, a cold fluid passage in said housing, a hot fluid passage in said housing, a mixing chamber in said housing in communication with said cold and hot fluid passages, a hot fluid valve in said housing for controlling communication between the hot fluid passage and the mixing chamber, a primary cold fluid valve in the housing for controlling communication between the cold fluid passage and the mixing chamber, a pair of secondary cold fluid valve ports between the cold water passage and the mixing chamber, said secondary cold fluid valve ports being in parallel with each other and in series with the primary cold fluid valve, single manually controllable means for opening and closing both the primary cold fluid valve and one of said secondary valve ports, and automatic differential pressure control means responsive to the pressures of said hot and cold fluids as said fluids flow through their respective passages to said mixing chamber for opening and closing the other of said secondary cold valve ports.

2. A liquid mixing valve assembly having a housing, a cold water passage in said housing, a hot water passage in said housing, a mixing chamber in said housing in communication with said cold and hot water passages, a hot water valve in said housing for controlling communication between the hot water passage and the mixing chamber, a primary cold water valve in the housing for controlling communication between the cold water passage and the mixing chamber, a pair of secondary cold water valve ports between the cold water passage and the mixing chamber, said secondary cold water valve ports being in parallel with each other and in series with the primary cold water valve, automatic differential pressure control means responsive to the flow of hot water through the hot water passage and to the flow of cold water through the cold water passage to the mixing chamber for opening and closing one of said secondary cold water valve ports, and valve means operable by a single manually rotatable valve stem for closing both the primary cold fluid valve and the other of said secondary cold water valve ports.

3. A liquid mixing valve assembly having a housing, a cold water passage in said housing, a hot water passage in said housing, a mixing chamber in said housing in communication with said cold and hot water passages, a hot water valve in said housing for controlling communication between the hot water passage and the mixing chamber, a primary cold water valve in the housing for controlling communication between the cold water passage and the mixing chamber, a pair of secondary cold water ports between the cold water passage and the mixing chamber, said secondary cold water ports being in parallel with each other and in series with the primary cold water valve, a floating differential pressure responsive piston valve for controlling the flow of hot and cold water from their respective passages to said mixing chamber and responsive to the pressures of said hot and cold water as said hot and cold water flows through their respective passages to said mixing chamber for closing one of said secondary cold water ports, a movable shuttle valve operative to open and close the other of said secondary cold water valve ports to control the flow of cold water from said cold water passage to said mixing chamber, a valve stem for positively actuating said hot water valve, said primary cold water valve, and said shuttle when said stem is rotated in said housing, and a shoulder on the hot water valve with clearance between said shoulder and said shuttle, whereby when the stem is turned to move the shuttle to a closed position, the primary cold water valve is opened substantially in advance of the hot water valve.

4. In a fluid mixing valve having a mixing chamber, hot and cold fluid inlet passages to said mixing chamber and hot and cold fluid valves for controlling the flow of hot and cold fluids through their respective passages to said mixing chamber, the sub-combination which comprises a shuttle guide in said passages having hot and cold fluid ports between the hot and cold fluid passages respectively and the mixing chamber, a hollow sleeve-like shuttle movable in the shuttle guide to control the hot and cold fluid ports therein, said shuttle having at least one hot fluid port therein adapted for selective registration with the hot fluid port in the shuttle guide, said shuttle also having at least one cold fluid port therein adapted to have continuous registration with the cold fluid port in the shuttle guide, manually operable means for moving the shuttle in the guide to selectively register the hot fluid ports in the shuttle and in the shuttle guide, thereby controlling the entire flow of hot fluid into the mixing chamber, a cold fluid by-pass providing communication between the cold fluid passage and the mixing chamber, valve means operatively associated with the shuttle for opening and closing said by-pass upon predetermined movement of the shuttle in the shuttle guide, a second cold fluid port in the shuttle providing selective communication between the cold fluid passage and the mixing chamber, and an automatic differential pressure control valve movable in the shuttle in response to the pressures of the hot and cold fluids as said fluids flow through their respective passages to said mixing chamber to automatically open and close the hot fluid port and said second cold fluid port in the shuttle in accordance with the differential pressure in said hot and cold fluid passages.

5. In a liquid mixing valve having a mixing chamber, hot and cold liquid inlet passages to said mixing chamber and hot and cold liquid valves for controlling the flow of hot and cold liquids through their respective passages to said mixing chamber, the sub-combination which comprises a shuttle guide in said passages having hot and cold liquid ports between the hot and cold liquid passages, respectively, and the mixing chamber, a hollow sleeve-like shuttle movable in the shuttle guide to control the hot and cold liquid ports therein, said shuttle having at least one hot liquid port therein adapted for selective registration with the hot liquid port in the shuttle guide, said shuttle also having at least one cold liquid port therein adapted to have continuous registration with the cold liquid port in the shuttle guide, manually operable means for moving the shuttle in the guide to selectively register the hot liquid ports in the shuttle and in the shuttle guide, thereby controlling the entire flow of hot liquid into the mixing chamber, a cold liquid by-pass providing communication between the cold liquid passage and the mixing chamber, valve means operatively associated with the shuttle for opening and closing said by-pass upon predetermined movement of the shuttle in the shuttle guide, a second cold liquid port in the shuttle providing selective communication between the cold liquid inlet passage and the mixing chamber, and a floating piston valve responsive to the pressure of the hot and cold liquids as said liquids flow through their respective passages to said mixing chamber and movable axially in the shuttle to automatically open and close the hot liquid port and said second cold liquid port in the shuttle in accordance with the differential pressure in the hot and cold liquid passages.

6. In a liquid mixing valve having a mixing chamber, hot and cold liquid inlet passages to said mixing chamber and hot and cold liquid valves for controlling the flow of hot and cold liquids through their respective passages to said mixing chamber, the sub-combination which comprises a shuttle guide in said passages having hot and cold liquid ports between the hot and cold liquid passages respectively and the mixing chamber, a hollow sleeve-like shuttle movable in the shuttle guide to control the hot and cold liquid ports therein, said shuttle having at least one hot liquid port therein adapted for selective registration with the hot liquid port in the shuttle guide, said shuttle also having at least one cold liquid port therein adapted to have continuous registration with the cold liquid port in the shuttle guide, manually operable means for moving the shuttle in the guide to selectively register the hot liquid ports in the shuttle and in the shuttle guide, thereby controlling the entire flow of hot liquid into the mixing chamber, walls defining an enlarged bore at one end of the shuttle guide forming a cold liquid by-pass providing communication between the cold liquid passage and the mixing chamber, an annular shoulder on one end of the shuttle axially movable in said enlarged bore and operative to open and close said by-pass upon predetermined movement of the shuttle in the shuttle guide, a second cold liquid port in the shuttle providing selective communication between the cold liquid inlet passage and the mixing chamber, and a floating piston valve responsive to the pressures of the hot and cold liquids as said liquids flow through their respective passages to said mixing chamber and movable axially in the shuttle to automatically open and close the hot liquid port and said second cold liquid port in the shuttle in accordance with the differential pressure in the hot and cold liquid passages.

7. In a liquid mixing valve having a mixing chamber, hot and cold liquid inlet passages to said mixing chamber and hot and cold liquid valves for controlling the flow of hot and cold liquids through their respective passages to said mixing chamber, the sub-combination which comprises a shuttle guide in said passages having hot and cold liquid ports between the hot and cold liquid passages respectively and the mixing chamber, a hollow sleeve-like shuttle movable in the shuttle guide to control the hot and cold liquid ports therein, said shuttle having at least one hot liquid port therein adapted for selective registration with the hot liquid port in the shuttle guide, said shuttle having a primary cold liquid valve at one end thereof positioned to control the entire flow of cold liquid between the cold liquid inlet passage and the mixing chamber, said shuttle also having at least one cold liquid port therein adapted to have continuous registration with the secondary cold liquid valve port in the shuttle guide providing communication between the primary cold liquid valve and the mixing chamber, manually operable means for moving the shuttle in the guide to selectively register the hot liquid ports in the shuttle and in the shuttle guide, thereby controlling the entire flow of hot liquid into the mixing chamber, walls defining an enlarged bore at one end of the shuttle guide forming a cold liquid by-pass around said secondary cold liquid valve port, an annular shoulder on one end of the shuttle axially movable in said enlarged bore and operative to open and close said by-pass upon predetermined movement of the shuttle in the shuttle guide, a second cold liquid port in the shuttle providing selective communication between the cold liquid inlet passage and the mixing chamber, and a floating piston valve responsive to the pressures of the hot and cold liquids as said liquids flow through their respective passages to said mixing chamber and movable axially in the shuttle to automatically open and close the hot liquid port and said second cold liquid port in the shuttle in accordance with the differential pressure in the hot and cold liquid passages.

CHARLES G. WALL.

References Cited in the file of this patent

UNITED STATES PATENTS

| Number | Name | Date |
|---|---|---|
| 1,508,938 | Powers | Sept. 16, 1924 |
| 1,869,663 | Cartier | Aug. 2, 1932 |
| 2,308,127 | Symmons | Jan. 12, 1943 |
| 2,417,158 | Frazer | Mar. 11, 1947 |